United States Patent
Haldeman et al.

(10) Patent No.: US 10,752,346 B2
(45) Date of Patent: Aug. 25, 2020

(54) ROTOR ASSEMBLY WITH COMPOSITE STATIC MAST

(71) Applicant: Bell Helicopter Textron Inc., Fort Worth, TX (US)

(72) Inventors: Andrew Paul Haldeman, Fort Worth, TX (US); Dalton T. Hampton, Fort Worth, TX (US); Frank Bradley Stamps, Colleyville, TX (US); John Lloyd, Arlington, TX (US); Gilberto Morales, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 319 days.

(21) Appl. No.: 15/787,093

(22) Filed: Oct. 18, 2017

(65) Prior Publication Data
US 2019/0112041 A1  Apr. 18, 2019

(51) Int. Cl.
*B64C 27/51* (2006.01)
*B64C 27/00* (2006.01)

(52) U.S. Cl.
CPC ............ *B64C 27/51* (2013.01); *B64C 27/001* (2013.01)

(58) Field of Classification Search
CPC ....... B64C 27/12; B64C 27/51; B64C 27/001; B64C 27/35; B64C 27/32; F16F 7/1034
See application file for complete search history.

(56) References Cited

U.S. PATENT DOCUMENTS

| | | | | |
|---|---|---|---|---|
| 3,674,689 | A * | 7/1972 | Giltrow | C10M 7/00 428/298.7 |
| 3,744,743 | A * | 7/1973 | Nay | B64C 27/12 244/17.11 |
| 4,886,377 | A * | 12/1989 | Adachi | B60B 33/08 384/49 |
| 5,515,041 | A * | 5/1996 | Spillman, Jr. | G01D 5/48 340/870.05 |
| 9,845,149 | B2 * | 12/2017 | Tian | B64C 27/10 |
| 10,017,247 | B1 | 7/2018 | Elliott et al. | |
| 10,472,057 | B2 | 11/2019 | Miller et al. | |
| 2014/0217232 | A1 * | 8/2014 | Griffin | F16F 13/24 244/54 |
| 2015/0251753 | A1 * | 9/2015 | Jarrett | B64C 27/35 416/104 |
| 2015/0307188 | A1 * | 10/2015 | Mazet | B64C 27/54 416/107 |
| 2018/0051765 | A1 | 2/2018 | Seifert et al. | |
| 2019/0100300 | A1 | 4/2019 | Haldeman et al. | |

* cited by examiner

*Primary Examiner* — Assres H Woldemaryam
(74) *Attorney, Agent, or Firm* — Lightfoot & Alford PLLC (57) ABSTRACT

A rotor assembly has a composite driveshaft extending between a transmission and a yoke for providing torque from the transmission to the yoke to cause rotation of the yoke and a plurality of rotor blade assemblies attached thereto. The rotor hub also has a composite static mast coupled to the yoke and a frame. The static mast being configured to carry the lift and thrust forces from the yoke to the frame.

18 Claims, 9 Drawing Sheets

ROTOR ASSEMBLY WITH COMPOSITE STATIC MAST

BACKGROUND

A rotorcraft, such as a tiltrotor or helicopter, includes at least one rotor mast for driving a rotor hub to transmit forces to the attached blades. Two of the most important objectives in rotorcraft design are safety and weight savings. Despite the objective to make everything on a rotorcraft as light as possible, the primary requirement of safety makes it very difficult to reduce the weight of the rotor mast. The difficulty in reducing the weight of the rotor mast is due to the tremendous loads carried through the rotor mast. Not only must the rotor mast transmit the torque from the transmission to the rotor hub, but the rotor mast must transmit the lift force created by the rotating blades to carry the full weight of the rotorcraft. In addition, the rotor mast is subject to lateral loads created by the movement of the rotorcraft as well as the wind. A traditional rotor mast transmits both the torque and the lift forces through a single rotating shaft. Because the worst possible failure a rotorcraft could suffer is mast failure, existing rotor masts utilize steel components to accommodate the large forces. While steel is very strong, it is also very heavy. Accordingly, a rotor mast that is lighter than steel, without sacrificing any of the safety, is extremely desirable.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure provides a lightweight composite rotor mast assembly with increased safety over traditional steel rotor masts. This is accomplished with a rotor mast assembly that utilizes two separate composite components. The first component is a rotating driveshaft that only transfers torque from the transmission to the yoke to cause rotation of the blades. The second component is a nonrotating conical static mast that carries the lift, thrust, and bending forces. In this configuration, even if the driveshaft fails, the rotor may still auto-rotate and transmit the resulting lift through the static mast to prevent a crash. Moreover, the separation of the torque from the lift and thrust forces, and the shapes of the two components that transfer those separate forces, enables the fibers of those two composite components to be laid in a pattern than ensures that the forces are transmitted in tension along the fibers of the composite parts, thereby greatly reducing any potential failure of the components. In addition, the weight savings allows for additional redundant features that also increase the safety of the system.

Figure 1:
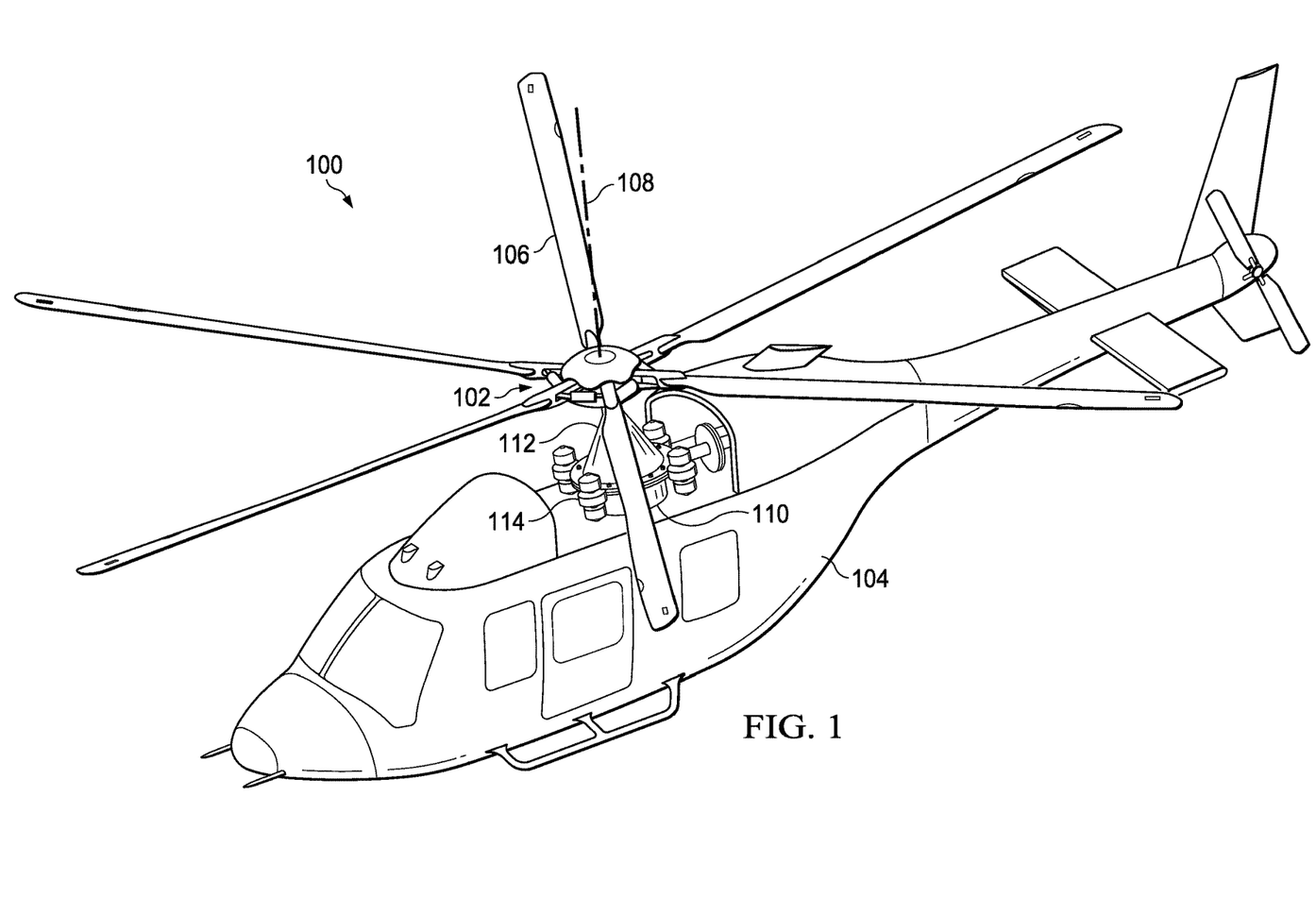
FIG. 1 is an oblique view of an aircraft comprising a rotor assembly according to this disclosure.

FIG. 1 illustrates an aircraft 100 comprising a main rotor assembly 102 according to this disclosure. Aircraft 100 comprises a fuselage 104 and rotor assembly 102 with a plurality of rotor blades 106. Rotor assembly 102 is driven in rotation about a mast axis 108 by torque provided by a powerplant (not shown) and routed through a transmission 110, both housed within fuselage 104. A portion of fuselage 104 is removed to expose a static mast 112, transmission 110, and liquid inertia vibration elimination ("LIVE") systems 114. Though aircraft 100 is shown as a helicopter having a single main rotor, rotor assembly 102 can alternatively be used on other types of aircraft, such as, but not limited to, helicopters having more than one main rotor or on tiltrotor aircraft. Also, rotor assembly 102 is shown as a main rotor for providing vertical lift and having collective and cyclic control, though rotor assembly 102 may alternatively be configured to provide longitudinal or lateral thrust, such as in a helicopter tail rotor or airplane propeller.

FIGS. 2 through 9 illustrate rotor assembly 102, each drawing having more components removed or shown as transparent for ease of viewing the interrelation of the components. A yoke 116 is coupled to a driveshaft 118 for rotation with driveshaft 118 about mast axis 108. Driveshaft 118 is also coupled to an output shaft (not shown) of transmission 110. Unlike a traditional rotor mast that is configured to carry torque, lift, and thrust loads, driveshaft 118 is configured to carry only a torque load from transmission 110 to yoke 116. Driveshaft 118 is preferably made of a composite material, preferably carbon fiber and a resin. Because driveshaft 118 is generally cylindrically shaped, and it only carries torque, the fibers of the composite can be oriented to ensure that the torque load is carried in tension by the fibers. In addition to the methods and structures described below to facilitate coupling driveshaft 118 to yoke 116 and transmission 110, the means for attachment to a hub and a transmission disclosed in U.S. patent application Ser. No. 15/611,813 ("'813 Application"), filed on Jun. 2, 2017, the entirety of which is incorporated herein by reference, may be utilized.

Figure 4:
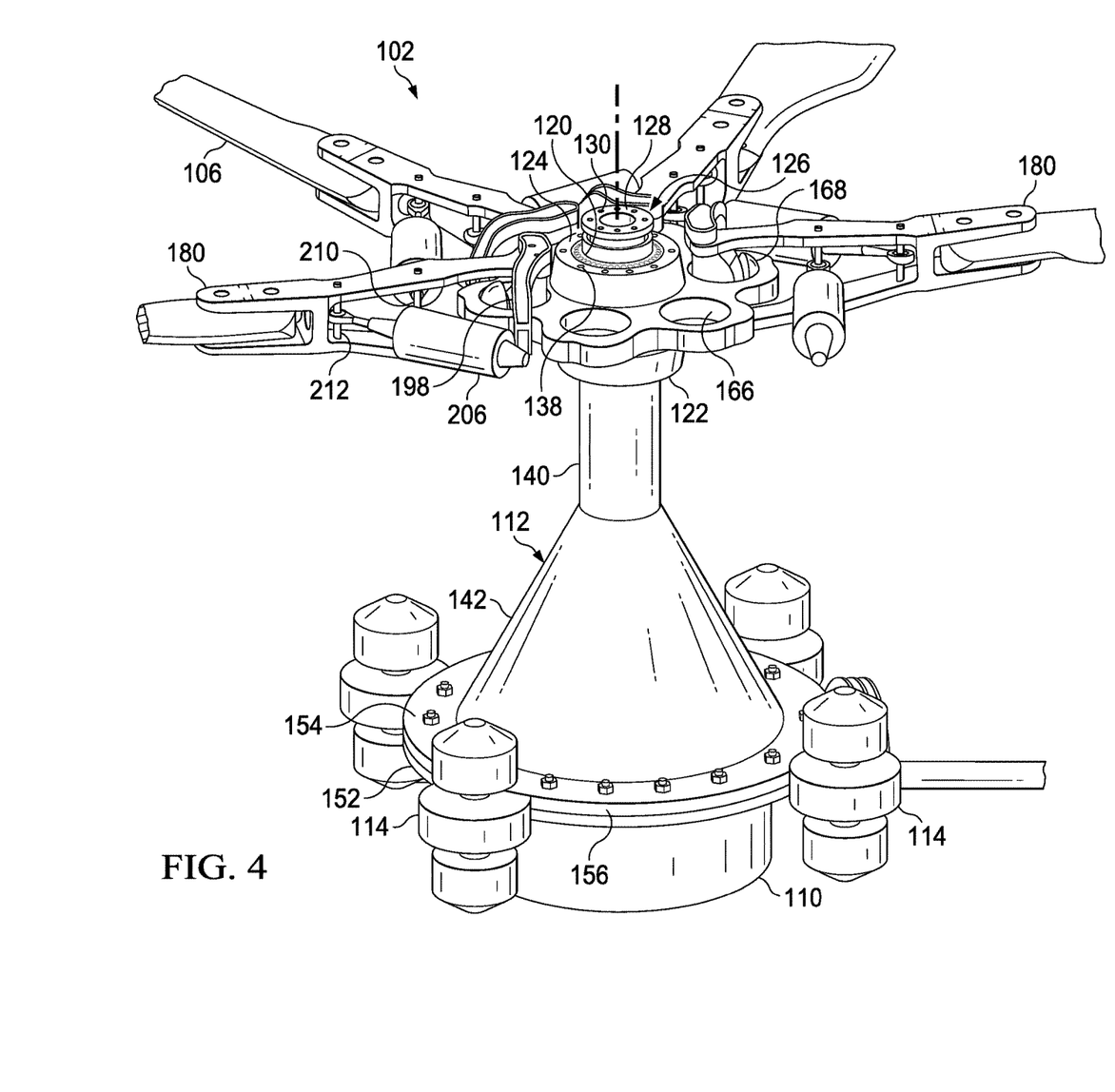
FIG. 4 is an oblique view of a portion of the rotor assembly of FIG. 4 with some components removed.
Figure 5:
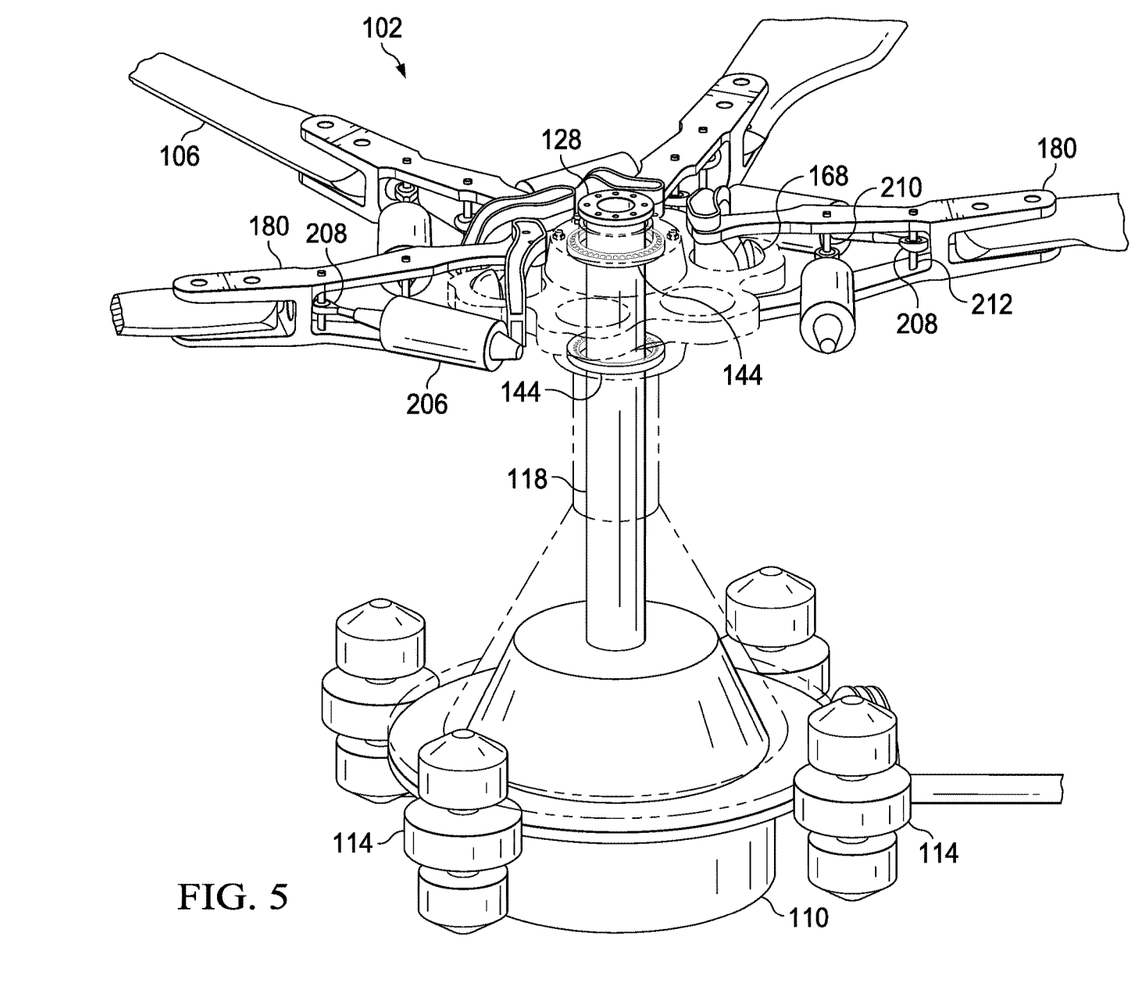
FIG. 5 is an oblique view of a portion of the rotor assembly of FIG. 1 with additional components shown as transparent and/or removed.
Figure 6:
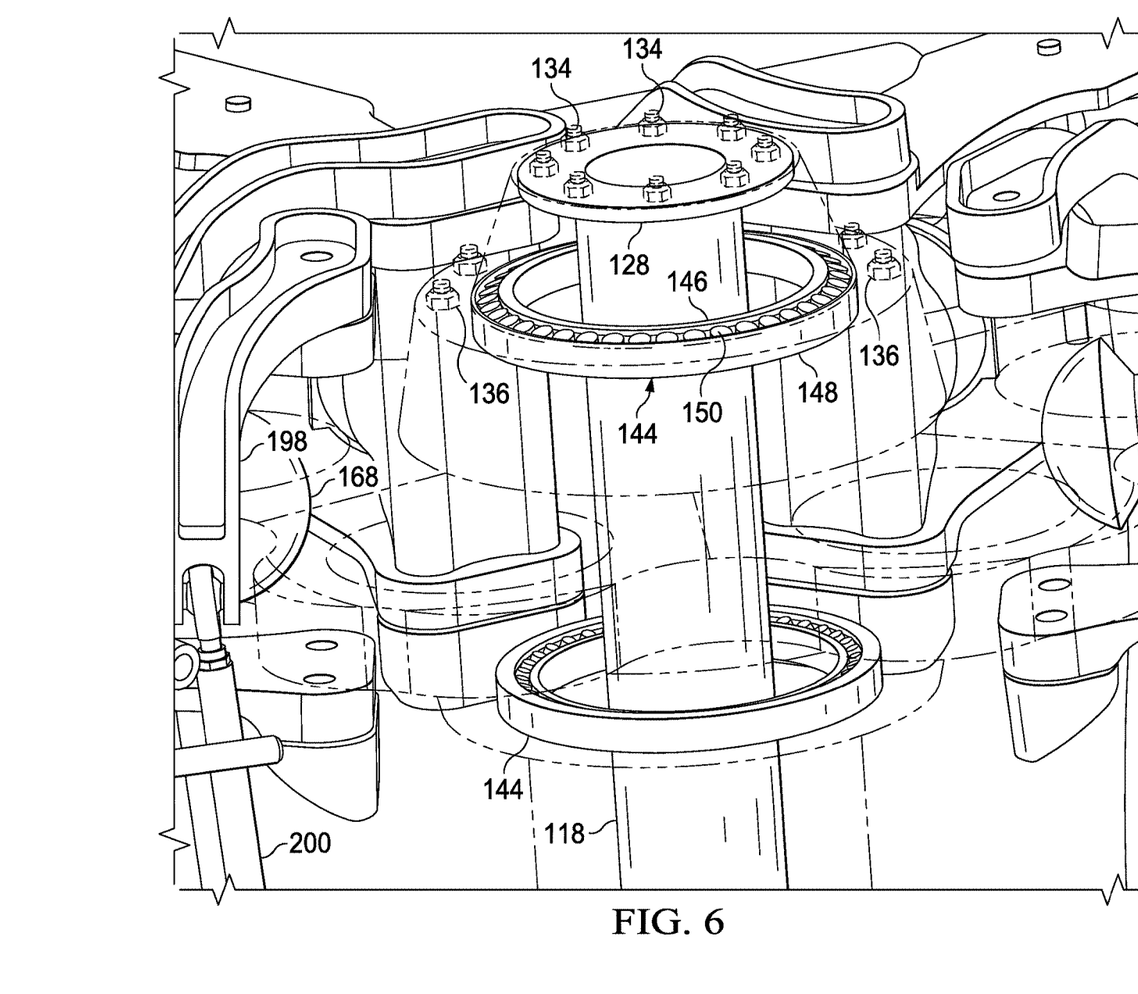
FIG. 6 is an oblique view of a portion of the rotor assembly of FIG. 1 with some components shown as transparent and/or removed.
Figure 7:
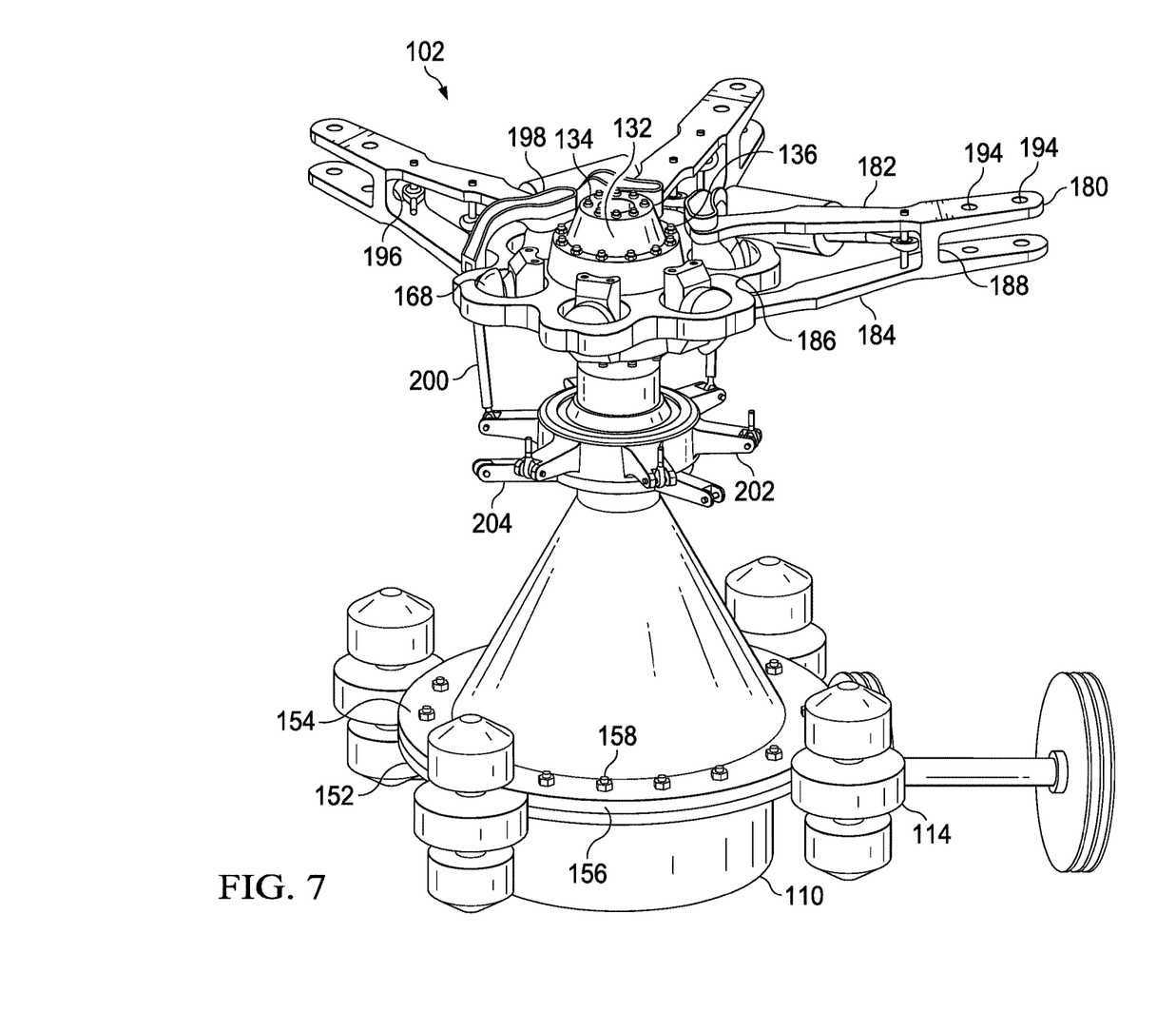
FIG. 7 is an oblique view of a portion of the rotor hub assembly of FIG. 1 with some components removed.
Figure 8:
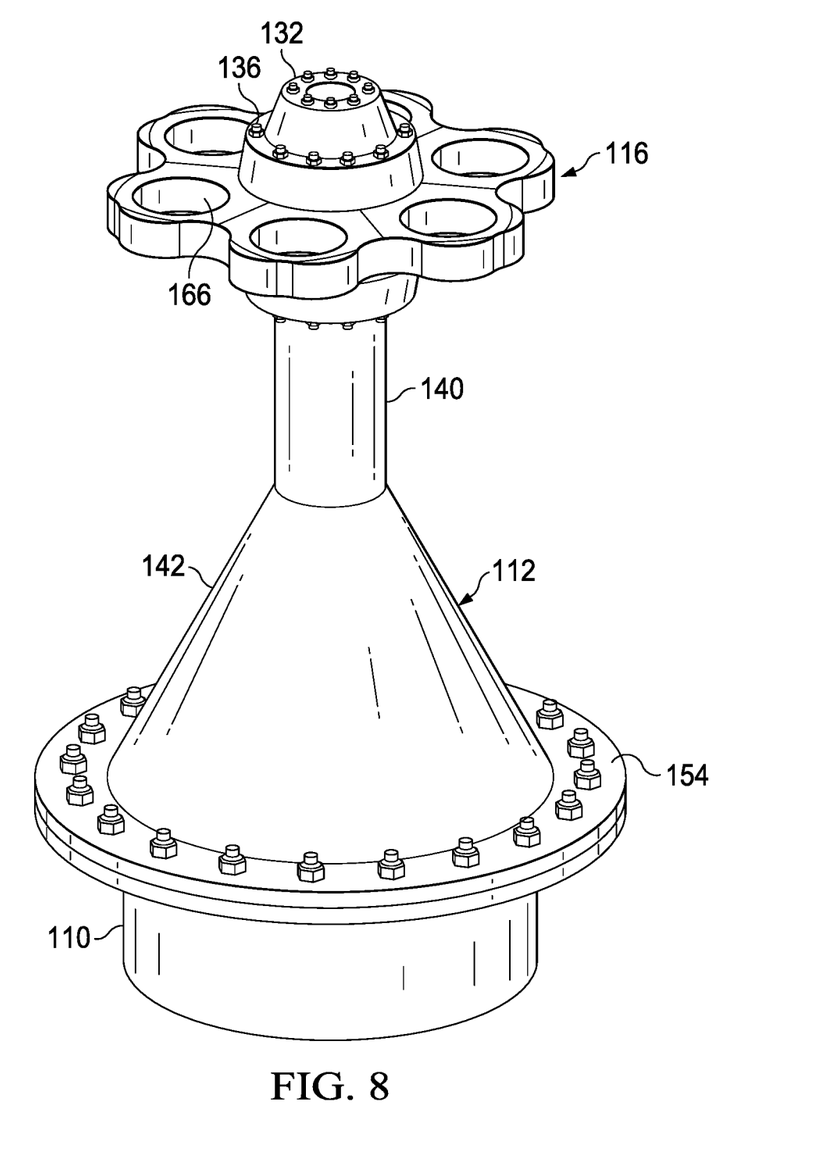
FIG. 8 is an oblique view of a portion of the rotor hub assembly of FIG. 1.
Figure 9:
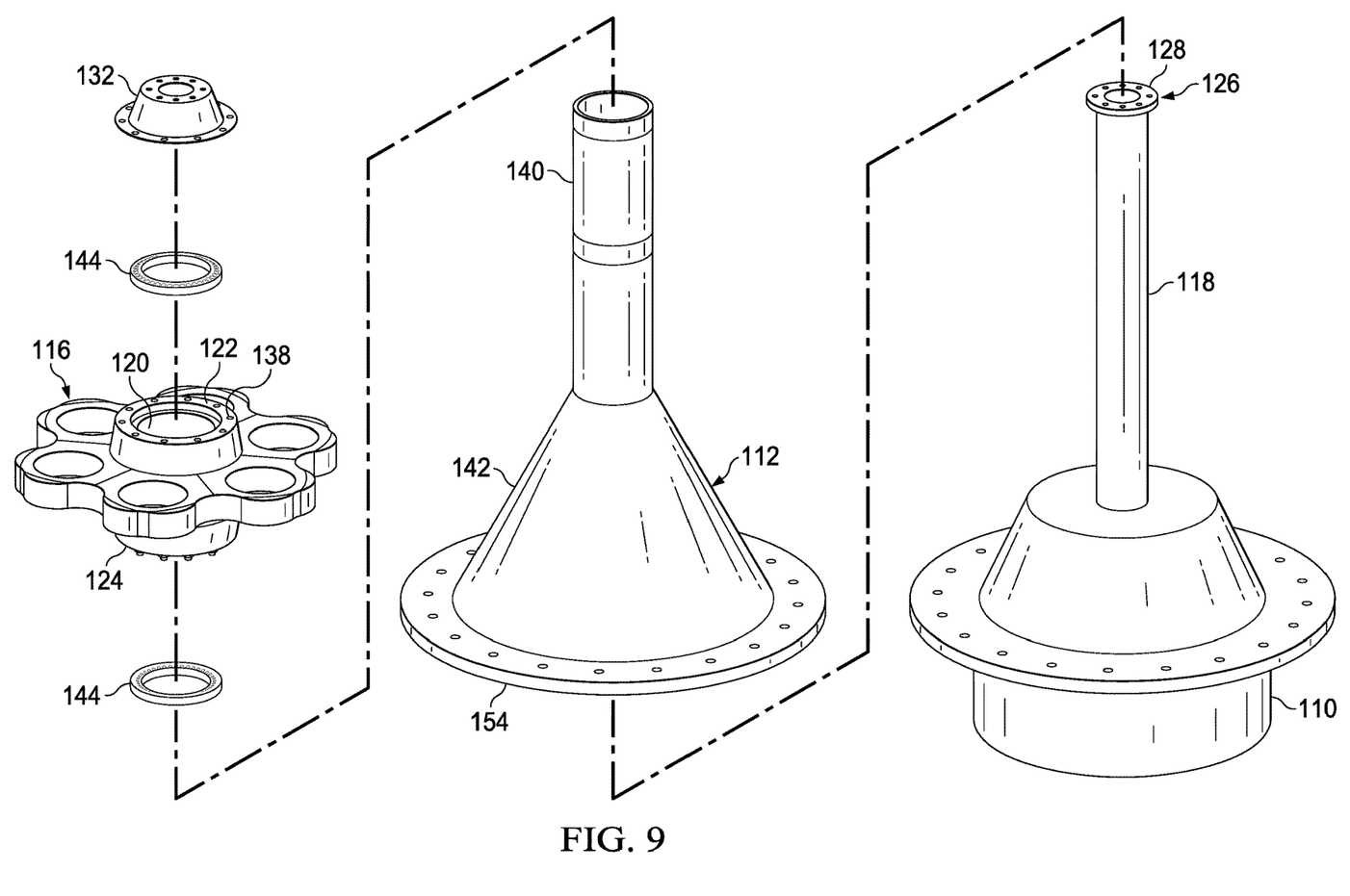
FIG. 9 is an exploded oblique view of a portion of the rotor hub assembly of FIG. 8.

As best shown in FIGS. 4-6, driveshaft 118 extends through an aperture 120 in yoke 116. Aperture 120 extends from a bottom surface 122 to a top surface 124 proximate a center of yoke 116 such that a first end 126 of driveshaft 118 is just above top surface 124 of yoke 116. First end 126 includes a flange 128 extending radially outward from mast axis 108. The transition from the shaft portion of driveshaft 118 to flange 128 should include a large radius to prevent any stress risers. Flange 128 includes a plurality of openings 130 extending therethrough. A cap 132 is coupled to flange 128 by a plurality of bolts 134 inserted through cap 132 and flange 128. Cap 132 is coupled to yoke 116 by a plurality of bolts 136 inserted through cap 132 and through a plurality of openings 138 extending from top surface 124 to bottom surface 122. Cap 132 may be made of a composite material or any other material suitable for aircraft manufacture. Alternatively, rather than using cap 132, flange 128 itself may extend over top surface 124, and flange 128 may be directly coupled to top surface 124 by inserting bolts 136 through flange 128 into yoke 116. In another alternative, yoke 116 may include a rim (not shown) extending upwards from top surface 124. The rim may include a plurality of openings having longitudinal axes that are perpendicular to and intersect mast axis 108, and driveshaft 118 may include a plurality of openings proximate first end 126 such that the openings in driveshaft 118 are coaxial with the openings in the rim. In this configuration, a plurality of bolts are inserted through the openings in the rim and driveshaft 118. While it is preferred that driveshaft 118 may be made of carbon fiber and resin, it should be understood that driveshaft 118 may be made of other suitable composite materials or metal.

While the torque is transferred to yoke 116 through driveshaft 118, the lift and thrust are carried from yoke 116 through static mast 112 to a frame (not shown) of aircraft 100. Static mast 112 includes a generally cylindrical top portion 140 and a generally conical bottom portion 142. While bottom portion 142 is preferably conical, bottom portion 142 may be any other shape suitable to transition from a wide base to the narrower top portion 140. For example bottom portion 142 may be ovoid or hyperbolic. Top portion 140 and bottom portion 142 are preferably a unitary structure made of a composite material, but they may be separate components, and they may be made of metal. Top portion 140 is configured to fit within aperture 120 of yoke 116. Coupled between an exterior surface of top portion 140 and an interior surface of aperture 120 there is a pair of radial bearings 144 which enable yoke 116 to freely rotate around static mast 112. In addition, radial bearings 144 are configured to retain yoke 116 in its longitudinal location on static mast 112 while transferring thrust and shear loads to static mast 112. Each radial bearing 144 includes an inner race 146 coupled to top portion 140, an outer race 148 coupled to yoke 116, and a plurality of rollers 150 disposed between inner race 146 and outer race 148. Rollers 150 may be tapered, cylinder, or ball bearings. In addition, inner race 146, outer race 148, and rollers 150 may all be made of composite materials, ceramic, metal, or a combination of thereof. Radial bearings 144 may be connected to a transmission oil distribution channel for lubrication thereof. Alternatively, radial bearings may be grease packed. Utilizing grease for lubrication would make transmission maintenance easier as there would be no need to disconnect the oil distribution channel for removal or repair. The extensive use of composites in the fabrication of components of rotor assembly 102 provides a significant weight savings that may allow for the incorporation of redundant systems which would provide additional safety and reliability. For example, rotor assembly 102 may include an extra pair of redundant radial bearings (not shown) coupled between top portion 140 of static mast 112 and yoke 116. The redundant radial bearings would enable safe continued operation in the event that one or both of radial bearings 144 fail.

As best shown in FIGS. 1-5, 7, and 8, static mast 112 is coupled to a case 152 of transmission 110. Static mast 112 includes an annular rim 154 extending radially from a second end 156 thereof. Annular rim 154 and case 152 include a plurality of openings configured to receive a plurality of bolts 158. Static mast 112 is also coupled to four LIVE systems 114. Examples of LIVE systems 114 are disclosed in U.S. patent application Ser. No. 15/240,797, filed on Aug. 18, 2016, the entirety of which is incorporated herein by reference. Each LIVE system 114 utilizes the inertial forces of a liquid contained within a closed system to counterbalance oscillatory forces transmitted to LIVE system 114 from static mast 112. LIVE systems 114 are also coupled to the frame of aircraft 100. As such, the oscillatory forces generated by rotor assembly 102 are cancelled by LIVE systems 114 and are not transmitted to fuselage 104, providing a much smoother and comfortable flight. Cancellation of the oscillatory forces also saves the components of aircraft 100 from the fatigue they would otherwise endure. Therefore, while rotor assembly 102 may be directly coupled to the frame of aircraft 100, or coupled through elastomeric joints, attaching rotor assembly 102 to the frame through LIVE systems 114 will provide the best results. With static mast 112 coupled to LIVE systems 114, LIVE systems 114 coupled to the frame of aircraft 100, and transmission 110 coupled to static mast 112, it is possible to disconnect transmission 110 from static mast 112 and driveshaft 118 and lower transmission 110 into an internal passenger and/or cargo compartment of aircraft 100 and out a door to perform maintenance on transmission 110. This allows the mechanic to leave the entire rotor assembly intact while performing maintenance on transmission 110, resulting in significant time savings.

Figure 2:
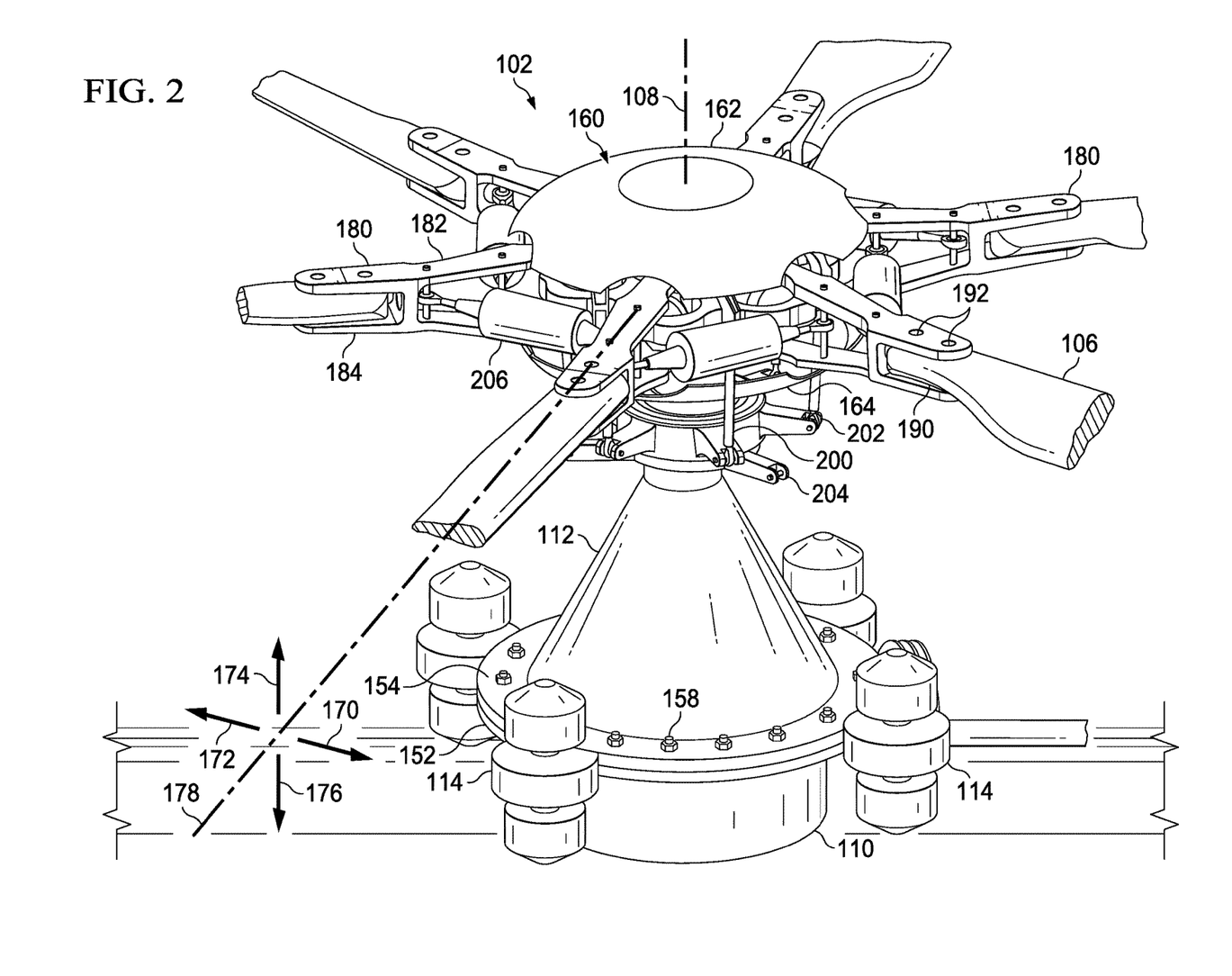
FIG. 2 is an oblique view of a portion of the rotor assembly of FIG. 1.
Figure 3:
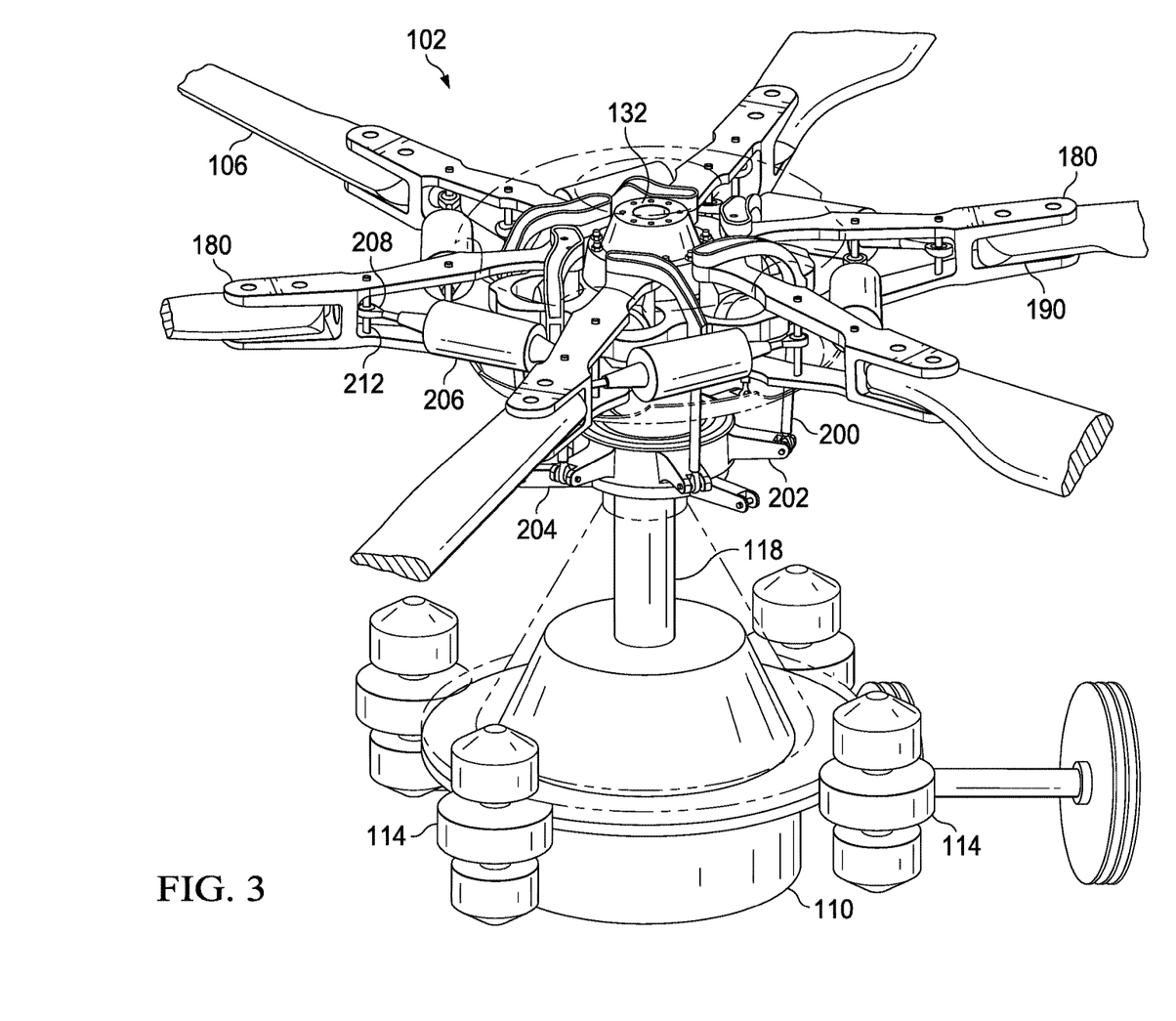
FIG. 3 is an oblique view of a portion of the rotor assembly of FIG. 1 with some components shown as transparent.

Yoke 116 has a unitary honeycomb configuration in the embodiment shown, though in other embodiments, yoke 116 may have a different configuration, such as a central portion with radially extending arms. Yoke 116 is preferably formed from a composite material, such as carbon fiber and resin, though yoke 116 may be formed from any appropriate material. In the embodiment shown, yoke 116 is configured for use with six rotor blades 106, though yoke 116 may be configured for use with any appropriate number of blades. As shown in FIGS. 1-3, yoke 116 may be enclosed by an aerodynamic protective cover 160. Cover 160 may include a top portion 162 and a bottom portion 164.

Yoke 116 has six bearing pockets 166, one bearing pocket 166 corresponding to each rotor blade 106. Each bearing pocket 166 carries a bearing 168. Wherein bearing 168 may be an axisymmetric elastomeric spherical bearing as disclosed in U.S. patent application Ser. No. 15/713,277, filed on Sep. 22, 2017, the entirety of which is incorporated herein by reference. Each bearing 168 is spaced a radial distance from mast axis 108 and transfers centrifugal force from the associated rotor blade 106 to yoke 116. Each bearing 168 forms a lead-lag hinge to allow for limited rotation of associated rotor blade 106 relative to yoke 116 in in-plane lead and lag directions about a lead-lag axis, as indicated by arrows 170 and 172, respectively. The lead-lag axis is substantially parallel to mast axis 108 and passes through a focal point of each bearing 168. Each bearing 168 also forms a flap hinge that allows for limited rotation in out-of-plane flapping directions about a flap axis, as indicated by arrows 174 and 176. The flap axis is substantially perpendicular to the lead-lag axis and also passes through the focal point of bearing 168. Each bearing 168 also forms a pitch change hinge that allows for limited rotation about a pitch change axis 178. Pitch change axis 178 is substantially perpendicular to the lead-lag axis and the flap axis and also passes through the focal point of bearing 168. While each rotor blade 106 can lead and lag about the associated bearing 168, during operation the centrifugal force tends to force each rotor blade 106 toward a centered, neutral position. It is from this neutral position that each rotor blade 106 can lead, by rotating forward (in the direction of rotation about mast axis 108, indicated by arrow 170) in-plane relative to yoke 116, or lag, by rotating rearward (indicated by arrow 172) in-plane relative to yoke 116.

A blade grip 180 couples each rotor blade 106 to associated bearing 168, each blade grip 180 includes an upper plate 182, a lower plate 184, an inner portion 186, and a central portion 188. Inner portion 186 and central portion 188 connect upper and lower plates 182, 184. As shown in the illustrated embodiment, inner portion 186 is a separate component that is coupled to upper and lower plates 182, 184, while central portion 188, upper plate 182, and lower plate 184 comprise a unitary structure. Alternatively, inner portion 186 and central portion 188 may be separate components that are coupled to upper and lower plates 182, 184. Each blade grip 180 is connected to a proximal end 190 of a rotor blade 106 with fasteners 192, thereby allowing loads from each rotor blade 106 to be transferred through blade grip 180 and bearing 168 to yoke 116. Fasteners 192 are inserted through blade attachment openings 194 extending through upper and lower plates 182, 184. Central portion 188 may include an aperture 196 extending therethrough. Proximal end 190 of rotor blade 106 may cooperatively engage central portion 188 and/or aperture 196 to provide additional rigidity between rotor blade 106 and blade grip 180.

A pitch horn 198 is coupled to each blade grip 180, allowing for actuation by a pitch link 200 coupled between pitch horn 198 and a rotating swashplate 202 of a flight control system for causing rotation of blade grip 180 and rotor blade 106 together about pitch change axis 178 for cyclic and collective control of rotor blades 106. Because static mast 112 is stationary, a nonrotating swashplate 204 may be coupled thereto. Though not shown, a droop stop limits droop of each rotor blade 106 and blade grip 180 assembly toward fuselage 104 when rotor assembly 102 is slowly rotating about mast axis 108 or at rest.

Each rotor blade 106 is coupled to each adjacent rotor blade 106 by a damper assembly 206, and each damper assembly 206 provides a resistive force and cooperates with each adjacent damper assembly 206 to prevent large oscillations in lead-lag directions 170, 172, and to maintain the frequency of in-plane oscillations below, or above, 1/rev, i.e., below, or above, the resonant frequency of the drive system. Damper assemblies 206 may be simple mono-tube dampers, twin-tube dampers, hysteresis dampers, dry or wet friction dampers, or magnetorheological dampers, wherein a magnetic field may continuously modify the fluid viscosity, and thereby modifying the damping properties. Damper assemblies 206 may provide adjustable or fixed, as well as, linear or nonlinear resistance. A connector, such as a rod end bearing 208, is installed at each end of damper assembly 206.

To provide for coupling of damper assemblies 206 to blade grips 180, a first shaft 210, located adjacent to yoke 116, and a second shaft 212, located adjacent to rotor blade 106, are rigidly coupled to each blade grip 180 such that first and second shafts 210, 212 intersect pitch change axis 178.

Each rod end bearing 208 is coupled to either first shaft 210 or second shaft 212 at the intersection of the respective shaft with pitch change axis 178. When assembled, each damper assembly 206 can be rotated a limited amount relative to each blade grip 180, allowing for rotor blades 106 to rotate about pitch change axis 178 without materially affecting movement in lead and lag directions 170, 172 relative to each other and to yoke 116. The resistive force of each damper assembly 206 is transferred to each blade grip 180 through associated rod end bearing 208, into first shaft 210 or second shaft 212, and into adjacent blade grip 180 to resist relative motion between blade grips 180 and their associated rotor blades 106. Because rod end bearings 208 are coupled directly to pitch change axis 178, the length of the lever arm between the resistive force and pitch change axis 178 is zero. Therefore, attachment directly to pitch change axis 178 effectively eliminates any rotational moments that may be caused by the transmission of force from damper assembly 206 to blade grip 180.

The configuration of rotor assembly 102 allows rotor blades 106 to "pinwheel" relative to yoke 116, in which all rotor blades 106 rotate in the same lead or lag direction 170, 172 relative to yoke 116, and this may especially occur in lag direction 172 during initial rotation about mast axis 108 of rotor assembly 102 from rest. As the centrifugal force on rotor blades 106 builds with their increased angular velocity, rotor blades 106 will rotate forward in the lead direction 170 to their angular neutral position relative to yoke 116. When damper assemblies 206 are configured as shown in FIGS. 1-7, with a first rod end bearing 208 attached to first shaft 210 proximate yoke 116 on a leading blade grip 180 and a second rod end bearing 208 attached to a second shaft 212 proximate rotor blade 106 on a trailing blade grip 180, damper assemblies will provide resistive force to the pinwheeling rotor blades 106. This occurs because second shafts 212 are further away from the lead-lag axis, and therefore, second shafts 212 translate a larger distance from neutral when rotor blades 106 rotate in-plane than do first shafts 210, causing elongation of damper assemblies 206 and the application of a resistive force. The magnitude of the distance between first shaft 210 and second shaft affects the amount of damping force applied during pinwheeling of rotor blades 106. The pinwheel damping provided by staggered damper assemblies 206 eliminates the need to include a filter in the full authority digital engine control (FADEC) to prevent the extremely low in-plane frequency common during pinwheeling from interfering with the engine control frequency.

While the embodiment described above is for a rotor hub with blade-to-blade dampers attached to the pitch change axis, similar to that which is disclosed in U.S. patent application Ser. No. 15/720,626, filed on Sep. 29, 2017, the entirety of which is incorporated herein by reference, such a configuration is not required. The rotor assembly could utilize any style of rotor hub. For example, the rotor assembly could use a stiff in-plane rotor hub as disclosed in U.S. patent application Ser. No. 15/432,910 ("'910 Application"), filed on Feb. 14, 2017, the entirety of which is incorporated herein by reference. The rotor assemblies disclosed in the '910 Application utilize high Lock number blades to maintain an in-plane frequency of greater than 1/rev without the need for dampers.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor assembly, comprising:
a driveshaft having a first end, a second end, and a length extending therebetween, the driveshaft being configured to be coupled to an output of a transmission proximate the second end of the driveshaft;
a yoke coupled to the driveshaft proximate the first end of the driveshaft, the yoke being configured to rotate with the driveshaft about a mast axis, the yoke including an interior surface defining an aperture through a center of the yoke;
a plurality of rotor blades;
a static mast formed as a unitary structure and having a top portion and a conical bottom portion having a lower diameter larger than an upper diameter, the static mast defining a channel extending through the top portion and the generally conical bottom portion, the channel configured to receive a majority of the length of the driveshaft therein, the static mast being made of a composite material; and
a pair of radial bearings, each radial bearing having an outer race coupled to the interior surface of the yoke, an inner race coupled to an exterior surface of the static mast, and a plurality of rollers disposed between the inner race and the outer race.

2. The rotor assembly of claim 1, further comprising:
a plurality of bearings, wherein each of the plurality of bearings is at least partially disposed within one of a plurality of bearing pockets in the yoke, each of the plurality of bearings forming a lead-lag hinge with a lead-lag axis that is substantially parallel to the mast axis, a flap hinge with a flap axis that is substantially perpendicular to and intersects the lead-lag axis, and a pitch change hinge with a pitch change axis that is substantially perpendicular to and intersects both the lead-lag axis and the flap axis; and
a plurality of rotor blade grips, each of the plurality of rotor blade grips coupling one of the plurality of rotor blades to one of the plurality of bearings.

3. The rotor assembly of claim 2, further comprising:
a plurality of damper assemblies, each of the plurality of damper assemblies including a first end and a second end, wherein the first end of each of the plurality of damper assemblies is coupled to one of the plurality of rotor blade grips and the second end of each or the plurality of damper assemblies is coupled to an adjacent one of the plurality of blade grips.

4. The rotor assembly of claim 2, further comprising:
a plurality of damper assemblies, each of the plurality of damper assemblies including a first end and a second end, wherein the first end of each of the plurality of damper assemblies is coupled to one of the plurality of rotor blade grips and the second end of each of the plurality of damper assemblies is coupled to another of the plurality of rotor blade grips.

5. The rotor assembly of claim 2, wherein the rotor assembly is configured to have a first in-plane frequency of 1.5/rev or greater.

6. The rotor assembly of claim 1, further comprising:
a liquid inertia vibration elimination (LIVE) system, the LIVE system being configured to attenuate transmission of vibrations from the static mast to a fuselage.

7. The rotor hub assembly of claim 1, wherein the pair of radial bearings is made of composite materials.

8. An aircraft rotor assembly, comprising:
a driveshaft having a first end, a second end, and a length extending therebetween, the driveshaft being configured to be coupled to an output of a transmission proximate the second end of the driveshaft, the driveshaft being made of a composite material;
a yoke coupled to the driveshaft proximate the first end of the driveshaft, the yoke being configured to rotate, with the driveshaft about a mast axis, the yoke including an interior surface defining an aperture through a center of the yoke;
a plurality of rotor blades;
a static mast formed as a unitary structure and having a cylindrical top portion and a conical bottom portion having a lower dimeter larger than an upper diameter, the static mast defining a channel extending through the generally cylindrical top portion and the generally conical bottom portion, the channel configured to receive a majority of the length of the driveshaft therein, the static mast being made of a composite material;
a pair of radial bearings, each radial bearing having an outer race coupled to the interior surface of the yoke, an inner race coupled to an exterior surface of the generally cylindrical top portion of the static mast, and a plurality of rollers disposed between the inner race and the outer race;
a plurality of bearings, wherein each of the plurality of bearings is at least partially disposed within one of a plurality of bearing pockets in the yoke, each of the plurality of bearings forming a lead-lag hinge with a lead-lag axis that is substantially parallel to the mast axis, a flap hinge with a flap axis that is substantially perpendicular to and intersects the lead-lag axis, and a pitch change hinge with a pitch change axis that is substantially perpendicular to and intersects both the lead-lag axis and the flap axis; and a plurality of rotor blade pips, each of the plurality of rotor blade grips coupling one of the plurality of rotor blades to one of the plurality of hearings.

9. The aircraft rotor assembly of claim 8, further comprising:

a cap, wherein the coupling of the yoke to the driveshaft is through the cap, the cap being coupled to a flange on the first end of the driveshaft, and the cap being coupled to a top surface of the yoke.

10. The aircraft rotor assembly of claim 8, further comprising:

a plurality of fasteners, wherein the coupling of the yoke to the driveshaft is through the plurality of fasteners, each fastener extending through an opening in the yoke and an opening in the driveshaft, a central longitudinal axis of each fastener being parallel to the mast axis.

11. The aircraft rotor assembly of claim 8, wherein the static mast is coupled to a case of the transmission.

12. The aircraft rotor assembly of claim 8, further comprising:

a liquid inertia vibration elimination (LIVE) system, the LIVE system being configured to attenuate transmission of vibrations from the static mast to a fuselage.

13. The aircraft rotor assembly of claim 8, further comprising:

a pitch horn coupled to each of the rotor blade grips;

a swashplate including a rotatable plate and a nonrotating plate, the nonrotating plate being coupled to the static mast; and a pitch link coupled to each of the pitch horns and the rotatable outer plate.

14. The aircraft rotor assembly of claim 8, further comprising:

a plurality of damper assemblies, each of the plurality of damper assemblies including a first end and a second end, wherein the first end of each of the plurality of damper assemblies is coupled to one of the plurality of rotor blade grips and the second end of each of the plurality of damper assemblies is coupled to another of the plurality of rotor blade grips.

15. An aircraft, comprising:

a fuselage defining an internal compartment;

a frame;

a powerplant;

a transmission coupled to the powerplant;

a driveshaft having a first end, a second end, and a length extending therebetween, the second end of the driveshaft being coupled to an output shaft of the transmission, the driveshaft being made of a composite material;

a static mast coupled to a case of the transmission, the static mast formed as a unitary structure and having a cylindrical top portion and a conical bottom portion having a lower dimeter larger than an upper diameter, the static mast defining a channel extending through the cylindrical top portion and the generally conical bottom portion, the channel configured to receive a majority of the length of the driveshaft therein, the static mast being made of a composite material; and a rotor assembly, comprising:

a yoke coupled to the driveshaft proximate the first end of the driveshaft, the yoke being configured to rotate with the driveshaft about a mast axis, the yoke including an interior surface defining an aperture extending through a center of the yoke, the yoke defining a plurality of radially space bearing pockets; a pair of radial bearings, each radial bearing having an outer race coupled to the interior surface of the yoke, an inner race coupled to an exterior surface of the generally cylindrical top portion of the static mast, and a plurality of rollers disposed between the inner race and the outer race; and a plurality of rotor blade assemblies, each rotor blade assembly comprising: a rotor blade; a bearing, wherein the bearing is at least partially disposed within one of the plurality of bearing pockets, the bearing forming a lead-lag, hinge with a lead-lag axis that is substantially parallel to the mast axis, a flap hinge with a flap axis that is substantially perpendicular to and intersects the lead-lag axis, and a pitch change hinge with a pitch change axis that is substantially perpendicular to and intersects both the lead-lag axis and the flap axis; and a blade grip coupling the rotor blade to the bearing.

16. The aircraft of claim 15, wherein the transmission is configured to be decoupled from the driveshaft and the static mast and lowered into the internal compartment of the fuselage for maintenance.

17. The aircraft of claim 15, further comprising:

a liquid inertia vibration elimination (LIVE) system, the LIVE system being configured to attenuate transmission of vibrations from the static mast to the frame.

18. The aircraft of claim 15, wherein the bearing of each of the plurality of rotor blade assemblies is an axisymmetric elastomeric spherical bearing.

\* \* \* \* \*